J. R. VAN TASSEL.
EYEGLASSES.
APPLICATION FILED DEC. 18, 1912.
Reissued Feb. 25, 1913.
13,537.
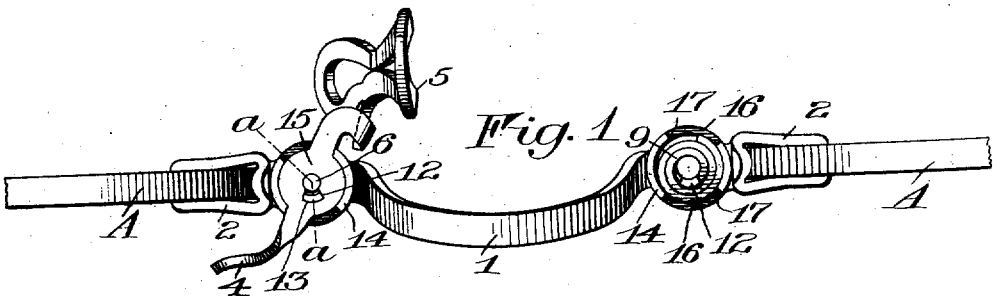
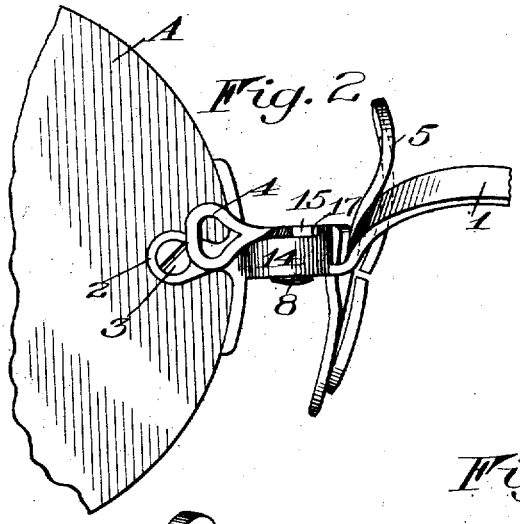
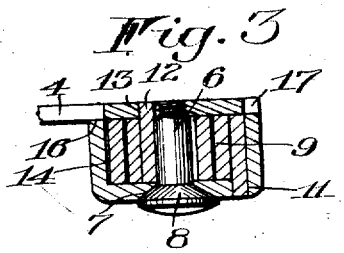
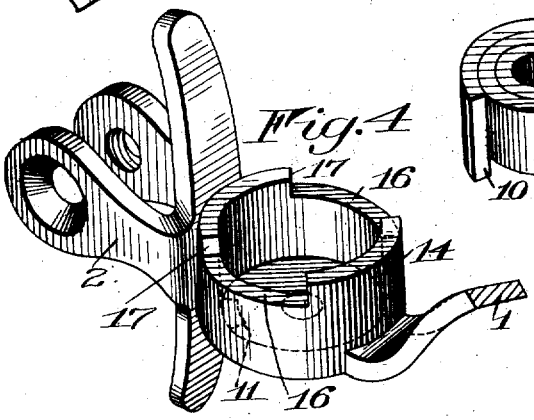
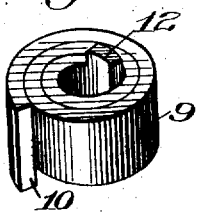
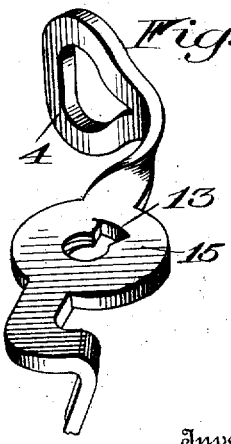
Inventor
John R. Van Tassel
Witnesses
Walter B. Payne
Nelson H. Copp
By Charles Rich
his Attorney

UNITED STATES PATENT OFFICE.

JOHN R. VAN TASSEL, OF GENEVA, NEW YORK, ASSIGNOR, BY MESNE ASSIGNMENTS, TO E. KIRSTEIN SONS COMPANY, OF ROCHESTER, NEW YORK, A CORPORATION OF NEW YORK, AND LEO F. ADT, OF ALBANY, NEW YORK.

EYEGLASSES.

13,537. Specification of Reissued Letters Patent. Reissued Feb. 25, 1913.

Original No. 1,040,062, dated October 1, 1912, Serial No. 458,405. Application for reissue filed December 18, 1912. Serial No. 737,564.

*To all whom it may concern:*

Be it known that I, JOHN R. VAN TASSEL, of Geneva, in the county of Ontario and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

The present invention relates to eyeglasses of the finger piece type in which the nose guards are moved relatively to their support by means of spring actuated levers in order to remove them from or position them on the nose of a wearer, and an object of the invention is to provide for the mounting of the guard positioning springs in such a manner that they will be inconspicuous and will be protected against blows or against handling by unskilled persons.

Another object is to provide for the removal of the guards without removing the positioning springs which, being very small, are liable to be mislaid.

Still further objects of the invention are to provide a pivotal mounting for the guard levers that will permit of a free and uniform swinging movement thereof but prevent axial movement or wabbling and to so arrange and connect the actuating springs that their manner of disposal will lend itself to the above ends and to the ready detachment and replacement of all these related parts.

To these and other ends the invention consists in certain improvements and combinations of parts all as will be hereinafter more fully described, the novel features being pointed out in the claims at the end of the specification.

In the drawings: Figure 1 is an enlarged top view of a pair of eyeglasses in which one of the guards is removed; Fig. 2 is an enlarged front view of a portion of the eyeglasses in proximity to one of the guards; Fig. 3 is a section on line *a—a* Fig. 1; Fig. 4 is a perspective view of one end portion of the support for the lenses; Fig. 5 is a perspective view of one of the springs for positioning the guards; and Fig. 6 is an enlarged detail view of one of the guards.

In the present embodiment of the invention there is employed a support which connects the lenses A. This support preferably comprises an arched bridging portion 1, and lens attaching devices which may be in the form of ears 2 connected by a lens screw 3, the lens attaching devices in this instance being connected with the bridging portion by portions to be hereinafter particularly described, on which the nose guards are mounted to swing.

The nose guards may be in the form of levers made of flat stock and each having one end formed into a finger piece or operating portion 4 and another end carrying a nose bearing portion 5 consisting of upper and lower nose engaging pads. The levers preferably swing about vertical axes so that they may move substantially in a horizontal plane to one side of the support, the axes of the levers being formed preferably by pivot pins 6 which are removably secured to the levers and turn in bearings 7 provided by perforating a portion of the support, heads 8 being arranged on the free or outer ends of the pivots in order to engage the support and hold the guards thereto.

The guards may be positioned by springs 9 which are preferably coiled into flat spiral form and have their axes coincident with the turning axes of the guards in order that a compact structure may be obtained. Each spring may be arranged on the same side of a lever with the support, so that a lever may be removed without removing the spring. Preferably it is arranged between the support and a lever in order that it will be protected by them. To this end each spring may surround one of the pivots 6 and have its outer end provided with a depending projection 10 that fits in a seat or recess 11 in the support and its inner end provided with an upwardly extending projection 12 that fits in a seat or recess 13 in the lever of a nose guard. With this arrangement it is possible to remove the guard while its spring is held to the support and to easily thereafter remove the spring as the coöperating projecting and recessed portions on the spring and the respective members with which it is interlocked are readily moved into or out of coöperation.

To further protect and conceal the springs 9 against blows and to prevent the wearer or other unskilled persons tampering with them they may be entirely inclosed. This may be effected by providing the support or the finger pieces with housings or cavities forming pockets. In this instance the portions of the support which connect the bridging portion 1 with the lens attaching devices 2 are provided with vertically opening pockets 14, the walls of which surround the springs vertically, the pockets being closed at the tops by enlarged circular portions 15 on the levers of the nose guards. The diameter of the circular portion of each guard may be substantially equal to the internal diameter of a pocket so that the circular portion may fit within a pocket, and the upper edge of a pocket may have recesses at 16 at diametrically opposite points to provide shoulders 17 that limit the swinging movement of the lever by engagement with opposite ends of the recesses.

In operation, a user presses the finger pieces 4 together which carries the nose bearing portions 5 away from each other, thus permitting the eyeglasses to be removed from or placed upon the nose. The springs which effect the movement of the nose bearing portions toward each other are completely housed and concealed so as to be protected against blows, and to prevent unskilled persons tampering with them. The guards may be removed without removing the springs as the springs are so arranged that they may be held in their proper places on the support. This is a very desirable feature as the guards may then be quickly attached to and detached from the support during fitting without taking the springs into consideration. The connection of the springs with the support and the guards dispenses with separate fasteners and the springs are of a form to give a maximum strength with a minimum size. By being secured at their inner ends to the guards they are contracted when the guards are separated and this especially adapts them for the small housings.

It will be observed that the housings or vertically opening pockets forming the connecting portions intermediate each end of the bridge and the adjacent lens attaching portion constitute, in effect, tables on which the guard levers turn but which are open at their centers to receive the springs beneath the levers. Thus the position of each spring is clearly defined and in assembling, it is simply thrust in an axial direction into the opening which alone insures its correct position and withdrawn as easily. The flat spiral coil is held against vertical movement or distortion and restricted definitely to its proper plane of operation by the two flat, parallel bearing surfaces on either side thereof, one constituted by the bottom wall of the housing and the other by the lever forming the top wall of the latter. The mode of connecting up the ends of the spring with the support and guard lever, respectively, is in accord with this arrangement, the arms or projecting lugs 12 on the inner convolutions and 10 on the outer being preferably straight and regular in form to extend out laterally at right angles parallel with the axis of the coil and take into the recesses or openings 11 and 13 in the respective parts, the former adjacent to or communicating with the opening in the lever for the reception of the pivot pin.

The pivot 6 itself is the part last applied and which maintains the others in coöperative relationship and by the bearing of the head 8 thereof on the underside of the connecting portion while the lever, to which it is rigidly secured, has an extended bearing on the table formed by the tops of the walls of the housing on the upper side, the lever is positively held against tilting or any appreciable axial movement.

So far as the function of concealing the spring is concerned, the bottom wall of the housing is not entirely essential, the front and rear vertical walls thereof, spaced apart one behind the other in a horizontal plane alone providing a protected intervening space for the reception of the spring between them. In fact, the front wall by itself is almost entirely effective to this end.

I claim as my invention:

1. In an eyeglass mounting, the combination with a support embodying a rigid bridging portion, lens attaching devices rigidly connected thereto and housings arranged between the bridging portion and the lens attaching devices, of springs inclosed by the housings and horizontal nose guards positioned by the springs and each having a forwardly extending operating portion and a nose bearing portion in rear of the lenses.

2. In an eyeglass mounting, the combination with a support embodying a rigid bridge and a lens attaching portion, and provided with a pocket or housing disposed to lie between an end of the bridge and the adjacent lens, said pocket comprising front and rear vertical walls, of a guard lever extending transversely of the pocket, to vibrate in a horizontal plane, and having a forwardly extending operating portion and a rearwardly arranged nose bearing portion, a pivot pin for the guard lever extending vertically through the pocket and a coil spring for positioning the guard arranged within the pocket and surrounding the pivot pin.

3. In a finger-piece eyeglass mounting, the combination with a support embodying a rigid bridge and a lens attaching portion and provided with a pocket or housing disposed to lie between an end of the bridge and the adjacent lens, said pocket comprising front and rear vertical walls having cut away portions terminating in shoulders, of a guard lever extending transversely of the pocket from front to rear to vibrate in a horizontal plane within the cut away portions of the front and rear walls and to engage the shoulders thereof as stops to limit their movement, a pivot pin for the guard lever extending vertically through the pocket and a coil spring for positioning the guard arranged within the pocket and surrounding the pivot pin.

4. In an eyeglass mounting, the combination with a support and a finger piece guard lever mounted to turn thereon, of a coil spring for positioning the guard and a housing arranged to surround and conceal the spring and having one wall constituted by the guard lever.

5. In an eyeglass mounting, the combination with a support having vertically opening pockets therein, of springs arranged in the pockets, and nose guards each embodying a lever closing a pocket and projecting forwardly and rearwardly from the support, the forwardly extending end serving as an operating portion for the guard and the rearwardly extending portion carrying a nose bearing portion.

6. In an eyeglass mounting, the combination with a support having vertically opening pockets, provided with recesses at diametrically opposite points, of nose guards embodying levers closing the pockets and working in the recesses and having their movements limited by the end walls of the recesses, and coil springs arranged in the pockets for positioning the guards.

7. In an eyeglass mounting, the combination with a support having vertically opening pockets provided with recesses at diametrically opposite points, of nose guards embodying levers working in the recesses, headed pivot pins removably secured to and depending from the levers, and flat spiral springs arranged in the pockets and having their inner ends secured to the levers and their outer ends secured to the support.

8. In an eyeglass mounting, the combination with a support and a finger piece guard lever mounted to turn thereon, of a coil spring for positioning the guard and a cylindrical housing surrounding and concealing the spring, an end wall of the housing being constituted by the lever and being provided with a recess into which an end of the spring is passed.

9. In an eyeglass mounting, the combination with a support, a guard lever mounted to turn thereon and provided with an opening having a recess communicating therewith, of a pivot pin for the guard lever passed through the opening, a housing surrounding the pivot and having an end wall constituted by the lever and a spring for positioning the guard surrounding the pivot within the housing and having one end passed through the recess in the guard lever.

10. In eyeglass mountings, the combination with the bridge provided with a cavity and an opening in the base of the cavity, of a guard arm pivotally connected with the bridge over the cavity, a guard, and a spring in the cavity having one end in the opening and its other end engaging the arm.

11. In an eyeglass mounting, the combination with a support comprising a bridging portion, lens attaching devices, and pocketed portions connecting the bridging portion to the lens attaching devices, of springs arranged in the pocket portions and nose guards positioned by the springs and pivotally connected to and closing the pocketed portions.

12. In an eyeglass mounting, the combination with a support embodying a bridging portion, lens attaching devices and housings connecting the bridging portions to the lens attaching devices, of springs inclosed by the housings, and nose guards positioned by the springs and each having a forwardly extending operating portion, and a nose bearing portion in rear of the lenses.

13. In an eyeglass mounting, the combination with a support embodying a bridging portion, lens attaching devices, and pocketed portions connecting the lens attaching devices with the bridging portions, of nose guards embodying levers closing the pockets and projecting forwardly and rearwardly from the support, the forwardly extending end providing an operating portion and the rearwardly extending portion carrying a nose bearing portion, and coil springs for positioning the guards arranged in the pocketed portions of the support with their axes coincident with the turning axes of the guards.

14. In an eyeglass mounting, the combination with a support comprising a bridge, a lens attaching portion and an intermediate portion disposed between the lens attaching portion and the bridge, of a finger piece guard lever arranged to turn in a horizontal plane to one side of the said intermediate portion and a coil spring for positioning the guard carried by the support and having one end acting against the latter and the other against the guard, said spring being disposed behind and in horizontal alinement with the intermediate portion.

15. In an eyeglass mounting, the combination with a support comprising a bridge, a lens attaching portion, and an intermediate portion embodying spaced walls lying in the same horizontal plane, in front and rear of each other, of a finger piece guard lever arranged to turn in a horizontal plane to one side of the intermediate portion and a spring for positioning the guard lever having coils concentric with the axis of the latter and lying between the said walls of the intermediate portion.

16. In an eyeglass mounting, the combination with a support embodying a table having an open center, of a finger piece guard lever arranged to turn on the table, a pivot therefor extending through the table and a spring for positioning the guard coiled about the pivot and removable through the open center of the table.

17. In an eyeglass mounting, the combination with a support embodying a table having an open center, and a supporting surface spaced from one side of the table, of a finger piece guard lever arranged to turn on the other side of the table, and a spring for positioning the guard lever coiled about the axis thereof to rest on the supporting surface and removable through the open center of the table.

18. In an eyeglass mounting, the combination with a bridge, a lens attaching portion and a connecting portion intermediate the first mentioned parts, forming a flat bearing surface, of a coil spring arranged with one end of the coil against the said surface, a guard lever arranged against the other end of the coil and a removable fastener extending through the lever, spring and connecting portion having a portion threaded into one of said outside parts and a headed portion bearing against the other.

19. In an eyeglass mounting, the combination with a support and a finger piece guard lever mounted to turn thereon, of a pair of flat parallel bearing surfaces, and a coil spring for positioning the guard wound in a flat spiral between the bearing surfaces and having its convolutions held by the surfaces against displacement from the general plane of the coil.

20. In an eyeglass mounting, the combination with a support and a finger piece guard lever mounted to turn thereon, of a pair of flat parallel bearing surfaces one of which is provided by the lever, and a coil spring for positioning the guard wound in a flat spiral between the bearing surfaces and having its convolutions held by the surfaces against displacement from the general plane of the coil.

21. In an eyeglass mounting, the combination with a support and a finger piece guard lever mounted to turn thereon, of a pair of flat parallel bearing surfaces, one of which is provided by the support, and a coil spring for positioning the guard wound in a flat spiral between the said bearing surfaces and having its convolutions held by the latter against displacement from the general plane of the coil.

22. In an eyeglass mounting, the combination with a support and a finger piece guard lever mounted to turn thereon, of a pair of flat parallel bearing surfaces, one of which is provided by the lever and the other of which is provided by the support, and a coil spring for positioning the guard wound in a flat spiral between said surfaces and having its convolutions held by the latter against displacement from the general plane of the coil.

23. In an eyeglass mounting, the combination with a support and a finger piece guard lever mounted to turn thereon, of a pair of flat parallel bearing surfaces, one of which is removable and a coil spring for positioning the guard wound in a flat spiral between the said surfaces and having its convolutions held by the latter against displacement from the general plane of the coil.

24. In an eyeglass mounting, the combination with a support having a flat bearing surface thereon, a guard lever arranged to turn on the support and having a flat bearing surface and means for holding the bearing surfaces on the guard and support in spaced parallel relationship, of a flat spiral spring for positioning the guard arranged between said surfaces and having its ends interlocked with the guard and support, respectively.

25. In an eyeglass mounting, the combination with a support, of nose guards carrying pivot pins journaled in the support and flat spiral springs surrounding the pivot pins and having their inner ends connected with the lever and their outer ends secured to the support.

26. In an eyeglass mounting, the combination with a support comprising a bridging portion, lens attaching devices and portions connecting the bridging portion with the lens attaching devices, of nose guards embodying levers pivotally mounted on the connecting portions of the support, and coil springs having their axes coincident with the pivots and arranged between the connecting portions and the levers of the nose guards.

27. In an eyeglass mounting, the combination with a support and a finger piece guard lever mounted to turn thereon, of a coil spring for positioning the guard wound in a flat spiral between the latter and the support with its flat sides disposed toward said parts, respectively, and interlocking projections at the ends of the spring proceeding from the opposite flat sides thereof, one of which coöperates with the guard lever and the other with the support.

28. In an eyeglass mounting, the combination with a support and a finger piece guard lever mounted to turn thereon and provided with an opening and with a recess communicating with the opening, of a pivot for the guard extending through the opening and a coil spring for positioning the guard wound in a flat spiral about the pivot in apposition to the lever and having its inner end coöperating with the recess in the latter.

29. In an eyeglass mounting, the combination with a support and a finger piece guard lever mounted to turn thereon, of a spring for positioning the guard and recessed and projecting portions on one of the parts and the spring, respectively extending in a direction longitudinally of the axis of the latter for connecting the spring to said part.

30. In an eyeglass mounting, the combination with a support and a finger piece guard lever mounted to turn thereon, of a flat spiral spring for positioning the guard and an interlocking connection between the inner end of the spring and one of said first mentioned parts comprising coöperative projecting and recessed portions on each, respectively.

31. In an eyeglass mounting, the combination with a support, a finger piece guard lever mounted to turn thereon, and a pivot pin for the guard extending through one of them, one of the parts being also provided with a recess adjacent to the pivot, of a flat spiral spring for positioning the guard having an axially extending projection on its inner convolution coöperating with the recess in one part and having its outer end connected to the other part.

32. In an eyeglass mounting, the combination with a support and a finger piece guard lever mounted to turn thereon, of a flat spiral spring for positioning the guard and an interlocking connection between the outer end of the spring and one of said first mentioned parts comprising coöperating projecting and recessed portions on each, respectively.

33. In an eyeglass mounting, the combination with a support and a finger piece guard lever mounted to turn thereon, of a flat spiral spring for positioning the guard and interlocking connections between the inner and outer end of the spring and the guard and support, respectively, comprising in each instance coöperating projecting and recessed portions on the respective parts.

34. In an eyeglass mounting, the combination with a support and a finger piece guard lever mounted to turn thereon, of a separable flat spiral spring for positioning the guard and an extension on the inner end of the spring proceeding outwardly away from such flat face of the coil to detachably coöperate with one of the first mentioned parts.

35. In an eyeglass mounting, the combination with a support and a finger piece guard lever mounted to turn thereon, of a pair of flat parallel bearing surfaces, one of which is provided with a recess, a coil spring for positioning the guard wound in a flat spiral between the surfaces and an extension on the spring at one end thereof extending laterally from the plane of the coil and coöperating with the recess.

36. In an eyeglass mounting, the combination with a support and a finger piece guard lever mounted to turn thereon, of a flat spiral coil spring for positioning the guard provided with an interlocking extension on its inner convolution forming a contacting portion disposed at right angles to the plane of the coil and coöperating with one of the parts at a point immediately adjacent to such inner convolution.

37. In an eyeglass mounting, the combination with a support and a finger piece nose guard mounted to turn thereon, of a separable flat spiral spring for positioning the guard arranged with one of its flat sides in apposition to one of the parts and an extension on the inner end of the spring proceeding outwardly from such flat face of the coil to coöperate with the apposed part.

38. In an eyeglass mounting, the combination with a support and a flat spiral spring arranged with one flat side adjacent to the support, of a finger piece guard lever arranged on the opposite flat side of the spring and interlocking connection between the guard and the inner end of the spring comprising a recessed portion on one of the parts into which a projection on the other extends.

39. In an eyeglass mounting, the combination with a support, and a finger piece guard lever, of a spring for positioning the guard located between the lever and support and a removable pivot extending through the support and spring and connected to the lever and provided with a headed portion engaging the opposite side of the support from that on which the lever is arranged.

40. In an eyeglass mounting, the combination with a support and a finger piece guard lever mounted to turn on one side thereof, of a detachable pivot pin connected to the lever and extending through the support, said pin being provided with a headed portion bearing on the opposite side of the support and a spring for positioning the guard coiled about the pivot pin.

41. In an eyeglass mounting, the combination with a support, of a detachable pivot pin extending into the support, a finger piece guard lever arranged to turn on one side of the support in coöperation with the pivot, one of said two last mentioned parts being provided with a rigidly connected portion bearing on the opposite side of the support to prevent axial movement, and a spring for positioning the guard coiled about and supported by the pivot pin.

42. In an eyeglass mounting, the combination with a support, of nose guards carrying headed and removable pivot pins journaled in the support, and coil springs arranged between the support and the guard.

43. In an eyeglass mounting, the combination with a support, of a nose guard, a pivot pin carried by one of said parts and having a bearing on the other, and a coil spring arranged about the pivot pin between the support and the guard.

JOHN R. VAN TASSEL.

Witnesses:

EDNA F. SMITH,

WILLIAM J. ESPEY.

Copies of this patent may be obtained for five cents each, by addressing the "Commissioner of Patents, Washington, D. C."